United States Patent [19]

Wilfong et al.

[11] Patent Number: 5,670,006

[45] Date of Patent: Sep. 23, 1997

[54] VIBRATION DAMPING CONSTRUCTIONS USING ACRYLATE-CONTAINING DAMPING MATERIALS

[75] Inventors: Debra L. Wilfong, Lake Elmo; David J. Drath; Michael C. Palazzotto, both of St. Paul; Peggy S. Willett, Stillwater; Henry B. Clark, III, Roseville, all of Minn.

[73] Assignee: Minnesota Mining and Manufacturing Company, St. Paul, Minn.

[21] Appl. No.: 464,001

[22] Filed: Jun. 2, 1995

Related U.S. Application Data

[60] Continuation of Ser. No. 99,181, Jul. 29, 1993, abandoned, which is a division of Ser. No. 823,872, Jan. 22, 1992, Pat. No. 5,262,232.

[51] Int. Cl.$^6$ .................................................... B32B 9/06
[52] U.S. Cl. ........................... 156/236; 156/247; 156/289; 428/327; 181/296
[58] Field of Search ............................ 428/413, 327, 428/461, 483, 463, 332, 412; 156/236, 231, 242, 247, 289; 181/208, 296

[56] References Cited

U.S. PATENT DOCUMENTS

| | | | |
|---|---|---|---|
| 3,640,836 | 2/1972 | Oberst et al. | 161/165 |
| 3,708,296 | 1/1973 | Schlesinger | 96/33 |
| 3,729,313 | 4/1973 | Smith | 96/27 |
| 3,741,769 | 6/1973 | Smith | 96/35.1 |
| 3,794,576 | 2/1974 | Watt | 204/159.11 |
| 3,808,006 | 4/1974 | Smith | 96/88 |
| 3,833,404 | 9/1974 | Sperling et al. | 117/63 |
| 3,847,726 | 11/1974 | Becker et al. | 161/186 |
| 4,026,705 | 5/1977 | Crivello et al. | 96/27 |
| 4,058,401 | 11/1977 | Crivello | 96/115 |
| 4,069,054 | 1/1978 | Smith | 96/115 |
| 4,069,055 | 1/1978 | Crivello | 96/115 |
| 4,101,513 | 7/1978 | Fox et al. | 526/193 |
| 4,216,288 | 8/1980 | Crivello | 430/280 |
| 4,231,951 | 11/1980 | Smith et al. | 260/446 |
| 4,250,203 | 2/1981 | Schlesinger et al. | 427/44 |
| 4,304,694 | 12/1981 | Scola et al. | 260/18 |
| 4,318,791 | 3/1982 | Felder et al. | 204/159.23 |
| 4,385,139 | 5/1983 | Kuchler et al. | 523/437 |
| 4,394,403 | 7/1983 | Smith | 427/42 |
| 4,447,493 | 5/1984 | Driscoll et al. | 428/332 |
| 4,623,676 | 11/1986 | Kistner | 522/15 |
| 4,642,126 | 2/1987 | Zador et al. | 51/295 |
| 4,652,274 | 3/1987 | Boettcher et al. | 51/298 |
| 4,684,678 | 8/1987 | Schultz et al. | 523/466 |
| 4,707,397 | 11/1987 | Morimura et al. | 428/216 |
| 4,707,432 | 11/1987 | Gatechair et al. | 430/281 |
| 4,707,534 | 11/1987 | Schultz | 528/97 |
| 4,734,323 | 3/1988 | Sato et al. | 428/317.3 |
| 4,910,270 | 3/1990 | Maekawa et al. | 525/532 |
| 4,957,973 | 9/1990 | Sogah | 525/280 |
| 5,008,324 | 4/1991 | Killgoar, Jr. et al. | 524/504 |
| 5,026,794 | 6/1991 | Ho et al. | 525/532 |
| 5,059,701 | 10/1991 | Keipert | 556/13 |
| 5,118,562 | 6/1992 | Johnson et al. | 428/327 |
| 5,164,260 | 11/1992 | Yoshinaka | 428/328 |
| 5,202,361 | 4/1993 | Zimmerman et al. | 522/120 |
| 5,225,498 | 7/1993 | Sorathia et al. | 525/454 |
| 5,252,694 | 10/1993 | Willet | 525/404 |
| 5,262,232 | 11/1993 | Wilfong et al. | 428/327 |

FOREIGN PATENT DOCUMENTS

| | | | |
|---|---|---|---|
| 109851 | of 0000 | European Pat. Off. | |
| 0 378 144 A2 | 7/1990 | European Pat. Off. | C08F 220/20 |
| 35 44 428 A1 | 6/1987 | Germany | C09J 3/00 |
| 2 161 168 A | 6/1985 | United Kingdom | C08F 224/00 |
| 2 244 954 A | 12/1991 | United Kingdom | B32B 25/18 |
| WO92/03483 | 5/1992 | WIPO | C08F 2/40 |

OTHER PUBLICATIONS

Kerwin and Ungar, "Sound and Vibration Damping with Polymers", No. 424 ACS Symposium Series, Chapt. 17 (1989).
Nielson, "Mechanical Properties of Polymers", pp. 162–165 (Reinhold Publ. Corp., NY) 1074.
Rosen, "Fundamental Principles of Polymeric Materials for Practicing Engineers", pp. 222–227 (Barnes and Noble Inc.) NY 1971.
Corsaro and Sperling, "Sound and Vibration Damping with Polymers", ACS Symposium Series No. 424 (1989).
Karabatos et al., *J. Org. Chem.* 30, 689 (1965).
Cox Jr., *J. Am. Chem. Soc.'y.* 80, 5441 (1958).
Goldwhite, *J. Am. Chem. Soc'y* 79, 2409 (1957).
Cox Jr., *J. Am. Chem. Soc'y* 34,2600 (1969).
Odian, "Principles of Polymerization" pp. 253–259 (Wiley-Interscience, 3rd ed. 1991).
Frisch and Reegan, "Ring Opening Polymerization", vol. 2 (Marcel Dekker, Inc. 1969).
Lee and Neville, "Handbook of Epoxy Resins", Appendix 4 (1967).
Bruins, "Epoxy Resins Technology" (1968).
"Photosynthesis and Applications of Polyfunctional Poly(n–Butyl Acrylate) Elastomers for Use in Epoxy Resin Roughening" Wang et al., Journal of Applied Polymer Science 44 (1992) Feb. 15, No. 5, New York.
Derwent Publications Ltd., London, AN 89–217488 & JP,A,1 156 151 (Fuji Kura Chemicals KK) 19 Jun. 1989.
Derwent Publications Ltd., London, AN 92–295733 & JP,A,4 202 596 (Nitto Denko Corp) 23 Jul. 1992.
Derwent Publications Ltd., London, AN 81–04973D & JP,A,55 149 597 (Pioneer Electronic Corp.) 21 Nov. 1980.
Patent Abstracts of Japan, vol. 014, No. 528(E–1004) 20 Nov. 1990 & JP,A,22 23 357 (Tokai Rubber Ind. Ltd.) 5 Sep. 1990.
International Search Report.
Derwent Publication Ltd., London, GB; AN 87–331330.
Derwent Publications Ltd., London, GB; AN 92–344624.
McCrum, N.G., ed., Principle of Polymer Engineering, Oxford University Press, pp. 112–137.

*Primary Examiner*—Jill L. Heitbrink
*Attorney, Agent, or Firm*—Gary L. Griswold; Walter N. Kirn; Carolyn V. Peters

[57] ABSTRACT

Acrylate-only and epoxy-acrylate thermoset resins exhibit high temperature damping behavior. These materials are suitable for damping vibrations in structures and component parts of devices where high temperature performance is required, such as in automobiles, aircraft, industrial equipment and appliances.

9 Claims, No Drawings

VIBRATION DAMPING CONSTRUCTIONS USING ACRYLATE-CONTAINING DAMPING MATERIALS

This application is a continuation of Ser. No. 08/099,181 filed Jul. 29, 1993, now abandoned, which is a division of Ser. No. 07/823,872 filed Jan. 22, 1992, now U.S. Pat. No. 5,262,232.

BACKGROUND OF THE INVENTION

1. Field of the Invention

This invention relates to vibration-damping constructions and a method useful for damping vibratory and/or noise emitting structures and component parts of devices such as automobiles, aircraft, industrial equipment, and appliances. This vibration-damping construction comprising at least a single layer of a thermoset resin. This invention further relates to a process of preparing the thermoset resins.

2. Description of Related Art

As technology moves toward energy conservation with the concomitant drive towards light weight structures that move at faster speeds and operate at higher temperatures, the acoustic and vibratory responses become larger and less desirable.

It has long been known that the vibration of component parts of devices and structures that vibrate under the influence of an applied internal or external force can be substantially reduced by the attachment of a layer of viscoelastic material. For example, U.S. Pat. No. 3,640,836 (Oberst et al.) describes a vibration-damping laminate in which the viscoelastic layer is a polymer comprised of ethylene, vinyl acetate and acrylic and/or methacrylic acid. U.S. Pat. No. 3,847,726 (Becker et al.) describes a viscoelastic adhesive composition of a polyepoxide, a polyether amine, a heterocyclic amine, and a phenol useful as vibration-damping material over a −25° to +60° C. range. Such compositions, however, are not effective for vibration-damping over prolonged periods of time at elevated temperatures.

U.S. Pat. No. 3,833,404 (Sperling et al.) describes viscoelastic damping compositions comprising an interpenetrating polymer network composition consisting essentially of 5–95% by weight of a polyalkyl acrylate elastomer, for example, polyethyl acrylate or polybutyl acrylate, polyvinyl acetate, polyurethane, polybutadiene, natural rubber, silicone rubber, butyl rubber, chloroprene, ethylene propylene terepolymer elastomers, polyvinyl alcohol, thiol rubber, and copolymers thereof; and 95–5% by weight of a plastic, such as polystyrene, poly-α-methyl styrene, polyalkyl acrylates, for example, polymethyl methacrylate or polyethyl methacrylate, poly-1-alkenes, for example, polypropylene, polyacrylic acid, and copolymers thereof, together with an outer plastic constraining layer.

Epoxies have traditionally been used as constraining layers in damping constructions since they do not exhibit any significant damping due to their highly crosslinked networks. Although U.S. Pat. No. 3,833,404 considers epoxy for the constraining layer, epoxy is not considered alone or in combination with other polymers as a potential viscoelastic damping material.

U.S. Pat. No. 4,385,139 (Kuchler et al.) describes a synthetic resin composition composed of at least two different polymers and a filler for use as starting material for vibration-damping sheets. In addition to at least one acrylic acid ester, at least one vinyl ester and inorganic filler, 1 to 10% by weight of an epoxide resin is added to the mixture relative to the sum total of the first 3 components.

U.S. Pat. No. 4,304,694 (Scala et al.) describes a damping composite comprising a resin matrix of about 20 to 43% by weight of a flexible epoxy, about 12 to 35% by weight of a stiff epoxy, about 35 to 61% by weight of a flexible crosslinking agent and about 20 to 50% by weight of a high modulus graphite fiber. The crosslinking agent described comprise a long chain amine-fatty acid amide.

U.S. Pat. No. 4,447,493 (Driscoll et al.) describes a constrained-layer damping construction containing a viscoelastic polymer that is the reaction product of (a) 25 to 75 weight percent of an acryloyl or methacryloyl derivative of at least one oligomer having a $T_g$ of less than 25° C. and a molecular weight per oligomer of 600 to 20 000 and (b) 75 weight percent of a monomer whose homopolymer has a $T_g$ of at least 50° C., the copolymer being suitable for damping vibrations at relatively high temperature, for example, 50° to 150° C. It appears that the 50°–150° C. damping regime was measured at a frequency of 1000 Hz. Since damping temperatures generally decrease about 6° to 7° C. with every decreasing decade of frequency, the copolymers described in the '493 patent would be expected to damp between about 30° and 130° C. at 1 Hz.

U.S. Pat. No. 4,684,678 (Schultz et al.) describes epoxy resin compositions that on curing yield cured resins having a high glass transition temperature, high ductility, and low moisture pick-up. 9,9-bis(aminophenyl)fluorenes are used as the curing agents.

U.S. Pat. No. 4,707,534 (Schultz) describes diglycidyl ethers of ortho-substituted-4-hydroxy-phenylfluorenes curable compositions comprising diglycidyl ethers, and cured resins thereof. The cured resins have a high glass transition temperature and improved modulus of elasticity.

U.S. Pat. No. 4,216,288 (Crivello) describes heat curable cationically polymerizable organic materials, such as epoxy resins, based on using an aromatic onium salt, combined with a reducing agent.

U.S. Pat. No. 4,910,270 (Maekawa et al.) describes a curable epoxy resin composition comprising (a) an epoxy resin, (b) a glycol type di(meth)acrylate, (c) a nitrogen containing heterocyclic compound, and (d) a polyamine having at least two amino groups with an active hydrogen.

U.S. Pat. No. 5,008,324 (Killgoar et al.) describes a process of using compositions comprising certain thermoplastic elastomeric polymers for damping and damping compositions comprising soft thermoset polymer containing microscopically discrete segments of said thermoplastic elastomeric polymers.

SUMMARY OF THE DISCLOSURE

Briefly, in one aspect of the present invention a method is provided for using acrylate-containing thermoset resins as vibration-damping materials. The method for damping the vibration of a vibrating solid article at temperatures above −20° C. to approximately 200° C. at 1 Hz comprises providing a viscoelastic layer construction with at least one layer of an epoxy-acrylate thermoset resin.

In another aspect of the present invention, a damping construction is provided, wherein the damping construction comprises at least one layer of viscoelastic material applied to a vibratory solid article, such that the viscoelastic material comprises an acrylate-containing thermoset resin.

In one variation of the damping construction of the present invention, the acrylate-containing thermoset resin is bonded to a vibratory solid article that is to be damped. This application is referred to as a "free" viscoelastic layer.

sometimes referred to as "extensional" damping. See Kerwin and Ungar, "Sound and Vibration Damping with Polymers," No. 424 ACS Symposium Series, Chapt. 17, (1989).

In another aspect of the present invention, an acrylate-containing thermoset resin is used in a three layer laminate comprising a base layer (vibratory solid object) to be damped, a viscoelastic layer, and a constraining layer. This application is referred to as a "constrained" viscoelastic layer, sometimes referred to as "shear" damping (Kerwin and Ungar, supra.).

Acrylate-containing thermoset resins, preferably those free of (meth)acrylic acid, more preferably epoxy-acrylate thermoset resins, provide a class of materials that exhibit high performance damping capabilities for use at operating temperatures between about −20° C. to 200° C. (at 1 Hz) and provide toughness over a much broader temperature range than is currently commercially available.

Furthermore, the resins are useful in variations of the constrained viscoelastic layer configuration, such as a segmented constraining layer, multiple constrained layer treatments, and multiple, overlapping segmented layers.

The present invention shows that compositions comprising acrylate-containing resins, in particular photopolymerized polymerized epoxy-acrylate resins exhibit improved thermal damping performances over the corresponding acrylates alone. Furthermore, using the photopolymerization process using only acrylates, shows improved thermal damping performances over current commercially available acrylate/acrylic acid damping materials. Additionally, the polymerization technology provides a unique and fast means of preparing multilayer laminates for a wide range of applications.

Properties of vibration-damping materials are described in the literature. Nielsen, L. E., "Mechanical Properties of Polymers," pages 162–65, Reinhold Publishing Corp., New York, (1965) discloses that materials possessing maximum vibration-damping capability have storage moduli, G', greater than $10^7$ dynes/cm$^2$ but less than $10^{10}$ dynes/cm$^2$ at the use temperature. Furthermore, Rosen, S. L., "Fundamental Principles of Polymeric Materials for Practicing Engineers," pages 222–27, Barnes & Noble Inc., New York, (1971), shows that it is desirable for a vibration-damping material to have both a storage modulus and a loss tangent with values as high as possible.

Corsaro, R. D. and Sperling, L. H. (Eds.), "Sound and Vibration Damping with Polymers," ACS Symposium Series No. 424, American Chemical Society, Washington D.C. (1989) disclose general definitions, and concepts, as well as specific applications for viscoelastic vibration-damping materials.

As used in this application:

"complex modulus", designated by G*, is expressed as $G^* = G' + iG''$;

"loss modulus", designated by G", is a measure of the equivalent energy lost (as heat);

"storage modulus", designated by G', is a measure of the equivalent energy stored elastically;

"acrylate-containing" means materials that are essentially free of (meth)acrylic acid, but contain an acrylate monomer, a mixture of acrylate monomers, or an acrylate-epoxy mixture;

"B-stage" means an intermediate stage in a thermosetting resin reaction in which the material softens when heated, and swell, but does not dissolve in certain liquids. (From ASTM Standard D907-91b);

"bireactive monomer" means a monomer that contains at least two free radically polymerizable groups or two cationically polymerizable groups and does not contain both types of groups, simultaneously;

"bifunctional monomer" means a monomer that contains both at least one free radically polymerizable group and at least one cationically polymerizable group;

"constrained layer" means a damping configuration comprising the component or structure to be damped, a viscoelastic layer, and a constraining layer;

"cure" and "polymerize" are used interchangeably in this application to indicate a chemical reaction, usually carried out with a catalyst, heat or light, in which a large number of relatively simple molecules combine to form a chain-like macromolecule;

"epoxy-acrylate thermoset resin composition" is used to indicate uncured compositions, comprising at least one acrylate monomer, at least one epoxy monomer, cationic polymerizable curing agent, and other adjuvants such as fillers, dyes, flame retardants, such that the uncured compositions can be cured to a "cured epoxy-acrylate thermoset resin";

"free layer" means a damping configuration comprising a viscoelastic layer bonded to the component or structure to be damped;

"$T_g$" means glass-rubber transition temperature;

"thermoplastic" means a high polymer that softens when exposed to heat and solidifies when cooled to room temperature; and "thermoset" means a high polymer that solidifies or "sets" irreversibly when cured. This property is associated with a crosslinking reaction of the constituents.

DESCRIPTION OF THE PREFERRED EMBODIMENT OF THE INVENTION

Acrylate-containing thermoset resins, in particular epoxy-acrylate thermoset resins, exhibit good high temperature damping behavior from about −20° C. to about 200° C. measured at 1 Hz, and as such are suitable as the viscoelastic component in both free-layer and constrained-layer damping constructions. The addition of other thermosets, thermoplastics and elastomers may also affect performance of the compositions.

While not wanting to be bound by theory, it appears the preferred polymer damping materials may comprise a combination of polymers and exhibit a microheterogeneous morphology where phase boundaries are diffuse and the minor phase (present in a lesser amount) has a size on the order of hundreds of Angstroms. Damping materials that consist of two or more polymers and have macroscopically phase separated morphologies (on the order of micrometers) display damping performance at temperatures associated with the $T_g$'s of the individual polymers. Conversely, two or more polymers that are mutually soluble and form a single phase exhibit damping over a narrow temperature range, the same as a single polymer. Thus, in order to achieve damping over a broad temperature range a multicomponent system is required.

Traditionally, in macroscopically phase separated systems, component polymers have been chosen based on the temperature interval between their respective $T_g$'s so that their individual damping characteristics overlap. However, with a microheterogeneous-morphology, damping behavior covering a broad temperature range is possible since there is a gradation of $T_g$ character resulting from intimate mixing at diffuse interface boundaries.

In general, damping materials are applied to structures and component parts in devices to attenuate resonant vibrations thereby reducing noise and vibrational fatigue. This is often accomplished by attaching a viscoelastic material of appropriate damping characteristics to the vibrating structure. Vibrational forces cause the viscoelastic material to undergo shear deformation where some of its inelastic deformation energy is converted to heat and then dissipated (mechanical hysteresis). Under cyclic loading, heat generated results in a temperature rise until heat generated per cycle is equal to heat dissipated through conduction, convection and radiation. The ability of a material to damp is measured by its ability to convert vibrational energy to heat energy.

In viscoelastic materials, the maximum amount of energy is dissipated as heat at $T_g$. Effectiveness of a viscoelastic material in energy dissipation is evaluated by measuring its viscoelastic response to a periodic stress or strain. Results of dynamic mechanical tests are generally given in terms of elastic or storage modulus, G', and viscous or loss modulus, G". G" is the damping or energy dissipation term. The angle which reflects the time lag between applied strain and stress is known as delta ($\delta$), and is defined by the ratio called the dissipation factor or loss factor.

Tan ($\delta$) is a damping term and is a measure of the ratio of energy dissipated as heat to maximum energy stored in the material during one cycle of oscillation and can be defined as:

$$\text{Tan}(\delta) = \frac{G''}{G'} \quad (I)$$

Dynamic mechanical criteria used to evaluate high temperature damping performance are as follows:

1. Tan ($\delta$) is above 100° C. at 1 Hertz,
2. Tan ($\delta$) is greater than 0.6 (in the shear mode), and
3. $10^7$ dynes/cm$^2$ < G' < $10^{10}$ dynes/cm$^2$.

Damping materials comprising acrylates and acrylic acid are known to decompose at relatively low temperatures (<160° C.). However, acrylate damping materials can be useful below their decomposition temperature, particularly if the materials do not contain acrylic acid, which is known to be a corrosive agent. Advantageously, the preferred process in the present invention for preparing acrylates provides acrylate damping materials with improved properties. The addition of epoxy and the resulting interpenetrating network, that is, between the epoxy and acrylate, further increases the thermal decomposition temperature over acrylate damping materials, and significantly over acrylate/acrylic acid damping materials.

Surprisingly, it has been found that epoxy-acrylate thermoset resins polymerized in the presence of one another to form an interpenetrating network are useful in high temperature damping applications.

A number of epoxy-acrylate thermoset resin compositions meet the criteria and are suitable for use in high temperature damping applications. These material exhibited a Youngs' storage modulus (E1) of about $1\times10^{10}$ dynes·cm$^{-2}$ in the glassy region and about $5\times10^6$ dynes·cm$^2$ in the rubbery plateau as determined from dynamic tensile and shear sandwich tests performed at 1 Hz. These values translate to a shear storage modulus (G$^1$) of about $4\times10^9$ dynes·cm$^{-2}$ in the glassy region and $2\times10^6$ dynes·cm$^{-2}$ in the rubbery plateau via the relationship of $$E=2(1+v)G \quad (II)$$

wherein v is Poisson's ratio that varies between 0 and 0.5, typically v is between 0.3 and 0.35 for plastics.

A process is provided, wherein polymerization of epoxy monomers and acrylate monomers in the presence of each other produces interpenetrating networks. The process is environmentally friendly in that the process is solventless and produces the cured epoxy-acrylate resins by application of heat and/or light. The process comprises:

(a) admixing at least one acrylate monomer, at least one epoxy monomer, a free radical initiator, and a cationic initiator, wherein the cationic initiator comprises:

(1) at least one organometallic complex salt,
(2) optionally, a thermally decomposable ester reaction product of a tertiary alcohol and an acid that forms a chelation complex with the metal ion of the organometallic complex salt, and (b) coating the admixture on at least one surface of a substrate, and (c) applying heat with a heating means.

An alternative process for the polymerization of the acrylate-only and epoxy-acrylate thermoset resins (also referred to as "thermoset resin" or "resin composition") composition may be carried out all at once or in a stepwise fashion. The resin composition comprises an acrylate syrup, that is a mixture of partially polymerized free radical monomers (0.0 to 15.0% conversion); substantially unpolymerized epoxy monomers; and optional adjuvants. "Acrylate syrup" as used in this application means a composition comprising a partially polymerized mixture of acrylates only or a partially polymerized mixture of acrylates and unpolymerized epoxy monomers.

Method A

A first step in the preparation of the acrylate syrup is to mix the polymerizable monomers (cationically and free radically polymerizable monomers) with a catalytically effective amount of a free radical initiator. Preferably, the free radical initiator is not a crosslinking agent and is generally present in an amount within the range of 0.01 to 10.0% by weight of the polymerizable composition, preferably in the range of 0.02 to 1.0% by weight of the polymerizable composition.

The second step is to apply energy to the polymerizable composition and allowing it to polymerize such that the viscosity is increased to within a range of 0.3 to 20.0 Pascal seconds (Pa·s) at ambient temperature. Preferably, the viscosity after this step is in the range of 0.5 to 2.0 Pa·s. The increased viscosity provides an acrylate syrup that is a more suitable coating composition for the production of the articles of the invention. The polymerizable composition may be polymerized using any well-known thermal polymerization techniques and quenched with air to attain the desired viscosity. Preferably, the free radical initiator is a photoinitiator, and the partial polymerization may be stopped at any point by eliminating the irradiation source.

A third step is to mix at least one organometallic complex salt and any optional bireactive free radically polymerizable monomer, bifunctional monomer, adjuvants and additional amount of the above-identified free radical initiator into the acrylate syrup.

A fourth step is to degas the curable compositions under vacuum to remove bubbles and dissolved oxygen. Although it is preferable to do this step just prior to coating, it may be carried out at any time from a few hours to several weeks prior to coating. To insure stability of the degassed curable compositions, it is preferable to keep them from unwanted exposure to light.

Method B

Alternatively, if the free radically polymerizable composition is derived from a mixture of one or more alkyl (meth)acrylates, an acrylate syrup of the free radically polymerizable monomers can be prepared without the addition of cationically polymerizable monomers.

The first step in the alternative method is to mix the free radically polymerizable monomers with a catalytically effective amount of a free radical initiator. Preferably, this free radical initiator is not a crosslinking agent and generally is present the amounts in the range of 0.01 to 10.0% by weight of the free radically polymerizable components, and preferably in the range of 0.02 to 1.0% by weight.

The second step is to apply energy to the polymerizable composition and allow it to polymerize such that the viscosity is increased to within a range of 0.3 to 20.0 Pa·s at ambient temperature. Preferably, the viscosity after this step is in the range of 0.5 to 2.0 Pa·s. The increased viscosity provides a syrup that is a more suitable coating composition for the production of the articles of the invention.

The polymerizable composition can be polymerized by any well-known thermal polymerization techniques and quenched with air to attain the desired viscosity. It is preferable to use a photoinitiator as the free radical initiator in this process, such that the partial polymerization may be stopped at any point by eliminating the irradiation source and then quenching polymerization with oxygen. It is preferable to use a low intensity irradiation source in this photochemical process and that the mixture be cooled during irradiation. Low intensity irradiation and cooling minimize gel formation during the syrup making process. After quenching the polymerization, optional bireactive monomers, bifunctional monomers, adjuvants and additional free radical initiators may be added.

The cationic initiator is then added to a cationically polymerizable material. If the cationic initiator is not readily soluble, dissolution can be aided by the application of heat. When heating the cationic initiator in the presence of the cationically polymerizable material, it is advantageous to reduce its exposure to light, thus minimizing the risk of unwanted polymerization. The cationic initiator can also be dissolved in a suitable solvent first and then added to the cationically polymerizable material.

It is also permissible to add the optional bireactive monomers, bifunctional monomers, adjuvants and additional free radical initiators to this composition.

The acrylate syrup and cationically polymerizable mixture are then mixed together. While it is permissible to mix the components in any order, it is preferable to add the acrylate syrup to the cationically polymerizable mixture. If optional bireactive monomers, bifunctional monomers, adjuvants and additional free radical initiators have not been added previously, they may be added at this time. The composition is thoroughly mixed to provide an even distribution of material.

The curable compositions are degassed under vacuum to remove bubbles and dissolved oxygen. While it is preferable to do this step just prior to coating, it can be carried out at any time from a few hours to several weeks prior to coating. To insure stability of the degassed curable compositions, it is preferable to keep them from unwanted exposure to light.

Method C

If the monomers are derived from the reaction product of (meth)acrylic acid and alcohol containing a heteroatom, oxygen, nitrogen, or sulfur in the chain, that is, polar (meth)acrylates, the monomers tend to gel, becoming crosslinked during the next stage of the syrup-making process and therefore difficult to use in any subsequent process. This has generally made these types of monomers unsuitable for syrup manufacture. It was surprising to find that the simple addition of an alkyl (meth)acrylate or other additives that can be broadly classified as chain transfer agents reduce or eliminate this tendency to form gels during the syrup-making process.

If, for example, an alkyl (meth)acrylate is used, then it can be used in any ratio with the polar acrylate. The ratio can be selected to control the final physical properties of the cured composition. The ratios can vary from 99:1 to 1:99, polar (meth)acrylate:alkyl (meth)acrylate. Generally, some intermediate ratio would be selected to optimize the contributions from the different monomers. The preferred range would be 80:20 to 20:80.

If, on the other hand, a chain transfer agent is used to inhibit gel formation in the polar acrylates, then a ratio of chain transfer agent:polar acrylate would be 10:90 to 0.5:99.5, preferably 5:95 to 0.5:99.5. Chain transfer agents useful in practicing the present invention are described in G. Odian *Principles of Polymerization* 253–59, at 252 (3d ed. 1991). Suitable chain transfer agents possess at least one abstractable hydrogen atom (that is, hydrogen atoms attached to a carbon atom adjacent to a heteroatom, such as, O, N, S, or hydrogen atoms attached to a secondary or tertiary carbon atom) but do not possess a free radically polymerizable group. For example, tetrahydrofuran (THF) would be a suitable chain transfer agent, however, the (meth)acrylated THF would not be suitable.

A second step is to apply energy to the polymerizable composition and allowing it to polymerize so that the viscosity is increased. This will provide a acrylate syrup generally having a viscosity of 300 to 20,000 centipoise at ordinary room temperature. Preferably, a suitable viscosity after this step is in the range of 500 to 2000 centipoise. The increased viscosity provides a composition that is more suitable coating composition for the production of the articles of the invention.

This partial polymerization process can be accomplished by conventional thermal polymerization techniques and then quenched with air to attain the desired viscosity. It is preferable to use a photoinitiator for this process, the partial polymerization may be stopped at any point simply be turning off the irradiation source and the polymerization can be quenched with oxygen. It is preferable to use a low intensity irradiation source in this photochemical process and that the mixture be cooled during irradiation. Low intensity irradiation and cooling minimize gel formation during the syrup making process. It is desirable to cool the composition to 10° C. or less to control any exotherm produced during the polymerization process.

After stopping the polymerization, optional bireactive monomers, bifunctional monomers, adjuvants and additional free radical initiators may be added.

The cationic organometallic is added to the cationically polymerizable material. If the cationic organometallic is not readily soluble, its dissolution can be aided by the application of heat. When heating the cationic organometallic in the presence of the cationically polymerizable material, it is advantageous to reduce its exposure to light. This will minimize the risk of unwanted polymerization. The cationic organometallic can also be dissolved in a suitable solvent first and then added to the cationically polymerizable material. It is also possible to add the optional bireactive monomers, bifunctional monomers, adjuvants and additional free radical initiators to this composition.

The acrylate syrup and cationically polymerizable mixture are mixed. While it is possible to mix the components in any order, it is preferred to add the acrylate syrup to the cationically polymerizable mixture. If the optional bireactive monomers, bifunctional monomers, adjuvants and additional free radical initiators have not been added previously, they can be added at this time. The composition is thoroughly mixed to provide an even distribution of material.

The curable compositions are degassed under vacuum. This helps to remove bubbles and dissolved oxygen. While it is preferable to do this step just prior to coating, it can be carried any time from a few hours to days even weeks before the actual coating. To keep these curable compositions stable, it is preferable to keep them from unwanted exposure to light.

The syrup from Methods (A), (B), or (C) may be coated onto a backing member and exposed to energy to complete the polymerization. The preferred method is by sequential exposure to irradiation of substantially different wavelengths to complete the polymerization, said process being called the "multi-color photoinitiation process."

In another aspect of the invention, a process for photopolymerization, followed by heat is described, wherein an acrylate-epoxy mixture containing a cationic organometallic catalyst, an oxalate ester accelerator and a free radical photoinitiator, is irradiated with UV light. The resultant B-stage film is a pressure sensitive adhesive that may be heat cured to form a free-standing, vibration damping film, or optionally, the adhesive can be bonded to one constraining layer and heat cured to form a tough vibration damping coating, or optionally, the adhesive can be used to make a vibration damping construction where the adhesive makes a heat curable bond between two constraining layers.

Free radically polymerizable monomers can be selected from (meth)acrylates and vinyl ester functionalized materials. Of particular use are (meth)acrylates. They can be monomers and/or oligomers such as (meth)acrylates (meth)acrylamides, vinyl pyrrolidione and azlactones. Such monomers include mono-, di-, or polyacrylates and methacrylates such as methyl acrylate, methyl methacrylate, ethyl acrylate, isopropyl methacrylate, isooctyl acrylate, acrylic acid, isobornyl acrylate, cyclohexylacrylate, benzylacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethanol triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyl dimethylmethane, bis[1-(3-acryloxy-2-hydroxy)]-p-propoxyphenyl-dimethylmethane, tris-hydroxyethyl isocyanurate trimethacrylate; the bis-acrylates and bis-methacrylates of polyethylene glycols of molecular weight 200–500, copolymerizable mixtures of acrylated monomers such as those described in U.S. Pat. No. 4,652,274, and acrylated oligomers such as those described in U.S. Pat. No. 4,642,126, and such descriptions are incorporated herein by reference.

Cationically polymerizable monomers include epoxy containing materials, alkyl vinyl ethers, styrene, divinyl benzene, vinyl toluene, N-vinyl compounds, 1-alkyl olefins (alpha-olefins), lactams and cyclic acetals.

Epoxy compounds that can be cured or polymerized by the catalyst system of this invention are those known to undergo cationic polymerization and include 1,2-, 1,3-, and 1,4-cyclic ethers (also designated as 1,2-, 1,3-, and 1,4-epoxides). The 1,2-cyclic ethers are preferred.

The cyclic ethers that can be polymerized in accordance with this invention include those described in Frisch and Reegan, *Ring-Opening Polymerizations* Vol. 2 (Marcel Dekker, Inc. 1969). Suitable 1,2-cyclic ethers are the monomeric and polymeric types of epoxides. They can be aliphatic, cycloaliphatic, aromatic, or heterocyclic and will typically have an epoxy equivalence of from 1 to 6, preferably 1 to 3. Particularly useful are the aliphatic, cycloaliphatic, and glycidyl ether type 1,2-epoxides such as propylene oxide, epichlorohydrin, styrene oxide, vinylcyclohexene oxide, vinylcyclohexene dioxide, glycidol, butadiene oxide, diglycidyl ether of bisphenol A, cyclohexene oxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, and epoxy silicones, e.g., dimethylsiloxanes having cycloaliphatic epoxide or glycidyl ether groups.

A wide variety of commercial epoxy resins are available and listed in Lee and Neville, *Handbook of Epoxy Resins* (1967) and in P. Bruins, *Epoxy Resin Technology* (1968). Representative of the 1,3- and 1,4-cyclic ethers which can be polymerized in accordance with this invention are oxetane, 3,3-bis(chloromethyl)oxetane, and tetrahydrofuran.

In particular, cyclic ethers which are readily available include propylene oxide, oxetane, epichlorohydrin, tetrahydrofuran, styrene oxide, cyclohexene oxide, vinylcyclohexene oxide, glycidol, octylene oxide, phenyl glycidyl ether, 1,2-butane oxide, diglycidyl ether of bisphenol A (e.g., "Epon 828" and DER 331"), vinylcyclohexene dioxide (e.g., "ERL-4206"), 3,4-epoxycyclohexylmethyl-3,4-epoxycyclohexanecarboxylate (e.g., "ERL-4221"), 3,4-epoxy-6-methylcyclohexylmethyl-3,4-epoxy-6-methylcyclohexanecarboxylate (e.g., "ERL-4201"), bis(3,4-epoxy-6-methylcyclohexyl methyl)adipate (e.g., "ERL-4289"), aliphatic epoxy modified with polypropylene glycol (e.g., "ERL-4050" and "ERL-4052"), dipentene dioxide (e.g., "ERL-4269"), epoxidized polybutadiene (e.g., "Oxiron 2001"), silicone epoxy (e.g., "Syl-Kem 90"), 1,4-butanediol diglycidyl ether (e.g., Araldite RD-2), polyglycidyl ether of phenolformaldehyde novolak (e.g., "DER-431"), Epi-Rex 521" and "DER-438"), resorcinol diglycidyl ether (e.g., Kopoxite"), polyglycol diepoxide (e.g., "DER-736"), polyacrylate epoxide (e.g., "Epocryl U-14"), urethane modified epoxide (e.g., "QX3599"), polyfunctional flexible epoxides (e.g., "Flexibilizer 151"), and mixtures thereof as well as mixtures thereof with co-curatives, curing agents or hardeners which also are well known (see Lee and Neville and Bruins, supra). Representative of the co-curatives of hardeners that can be used are acid anhydrides such as nadic methyl anhydride, cyclopentanetetracarboxylic dianhydride, pyromellatic anhydride, cis-1,2-cyclohexanedicarboxylic anhydride, and mixtures thereof.

The free radical initiator can be selected from those compounds that generate free radicals upon exposure to heat or radiation, see for example those compounds disclosed in U.S. Pat. No. 4,707,432, incorporated herein by refernce. They are selected from acetophenones and ketals, benzophenones, aryl glyoxalates, acylphosphine oxides, sulfonium and iodonium salts, and diazonium salts. The preferred additional free radical initiators that are light activated are those that have an absorption maximum in the 300 to 500 nm region.

Acetophenones and ketals are generally described in U.S. Pat. No. 4,318,791 and such description is incorporated herein by reference. Examples of preferred acetophenones and ketals useful in the compositions of the present invention include, but are not limited to the following:

2,2-dimethoxyacetophenone
2,2-dimethoxy-2-phenylacetophenone
2,2-diethoxyacetophenone
2,2-dibutoxyacetophenone
2,2-dihexoxyacetophenone
2,2-di(2-ethylhexoxy)acetophenone
2,2-diphenoxyacetophenone
2,2-ditolyloxyacetophenone
2,2-di(chlorophenyl)acetophenone
2,2-di(nitrophenly)acetophenone
2,2-diphenoxy-2-phenylacetophenone
2,2-dimethoxy-2-methylacetophenone
2,2-dipropoxy-2-hexylacetophenone
2,2-diphenoxy-2-ethylacetophenone
2,2-dimethoxy-2-cyclopentylacetophenone
2,2-di(2-ethylhexyl)-2-cyclopentylacetophenone
2,2-diphenoxy-2-cyclopentyl-acetophenone
2,2-di(nitrophenoxy)-2-cyclohexylacetophenone
2,2-dimethyl-2-hydroxyacetophenone
2,2-diethoxy-2-phenylacetophenone
2,2-diphenethyloxy-2-phenylacetophenone
2,2-(2-butenediyloxy)-2-phenylacetophenone
2,2-dimethyl-2-morpholino-(p-thiomethyl)acetophenone
1-hydroxycyclohexyl phenyl ketone.

Photoinitiators which are useful for partially polymerizing alkyl acrylate monomer without crosslinking, to prepare the above-identified syrup and as the additional free radical initiator, include the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2-phenylacetophenone), substituted alpha-ketols (such as 2-methyl-2-hydroxypropiophenone), aromatic sulfonyl chlorides (such as 2-naphthalene-sulfonyl chloride) and photoactive oximes [such as 1-phenyl-1,1-propanedione-2 (o-ethoxycarbonyl)oxime]. In preparing the syrup, they may be used in amounts which as dissolved provide about 0.001 to 0.5 percent by weight of the alkyl acrylate monomer, preferably at least 0.01 percent. When used in the final curable composition, they may be used in amounts which as dissolved provide about 0.01 to 5.0 percent by weight of the alkyl acrylate monomer, preferably 0.1 to 2%.

Suitable organometallic complex salt include those described in U.S. Pat. No. 5,059,701 (Keipert), and such description is incorporated herein by reference. In addition to the organometallic complex salts described in U.S. Pat. No. 5,059,701, all the organometallic complex salts described in EPO Nos. 109,851 are also useful in the present invention. The preferred salts of organometallic complex cations useful in the compositions of the present invention are dervied from a class of substitued and unsubstitued aromatic compounds based on a benzene or cyclopentadienyl nucleus, the metal atom is iron, and the anion is tetrafluoroborate, hexafluorophosphate, hexafluoroarsenate, or hexafluoroantimonate.

Suitable salts of organometallic complex cations include but are not limited to, those salts having the following formula:

$[(L^1)(L^2)M^p]^{+q} Y_n$ (III)

wherein $M^p$ represents a metal selected from the group consisting of Cr, Mo, W, Mn Re, Fe, and Co;

$L^1$ represents 1 or 2 ligands contributing pi-electrons that can be the same or different ligand selected from the group of: substituted and unsubstituted $eta^3$-allyl, $eta^5$-cyclopentadienyl, and $eta^7$-cycloheptatrienyl, and $eta^6$-aromatic compounds selected from $eta^6$-benzene and substituted $eta^6$-benzene compounds and compounds having 2 to 4 fused rings, each capable of contributing 3 to 8 pi-electrons to the valence shell of $M^p$;

$L^2$ represents none, or 1 to 3 ligands contributing an even number of sigma-electrons that can be the same or different ligand selected from the group of: carbon monoxide, nitrosonium, triphenyl phosphine, triphenyl stibine and derivatives of phosphorus, arsenic and antimony, with the proviso that the total electronic charge contributed to $M^p$ results in a net residual positive charge of q to the complex;

q is an integer having a value of 1 or 2, the residual charge of the complex cation;

Y is a halogen-containing complex anion selected from $BF_4^-$, $AsF_6^-$, $PF_6^-$, $SbF_5OH^-$, $SbF_6^-$, and $CF_3SO_3^-$; and n is an integer having a value of 1 or 2, the number of complex anions required to neutralize the charge q on the complex cation;

Examples of suitable salts of organometallic complex cations useful in the composition of the invention include the following:

($eta^6$-benzene)($eta^5$-cyclopentadienyl)iron(1+) hexafluoroantimonate ($eta^6$-toluene)($eta^5$-cyclopentadienyl)iron(1+) hexafluoroarsenate ($eta^6$-cumene)($eta^5$-cyclopentadienyl)iron(1+) hexafluorophosphate ($eta^6$-p-xylene)($eta^5$-cyclopentadienyl)iron(1+) hexafluoroantimonate ($eta^6$-xylenes(mixed isomers))($eta^5$-cyclopentadienyl)iron (1+) hexafluoroantinomate ($eta^6$-xylenes(mixed isomers))($eta^5$-cyclopentadienyl)iron (1+) hexafluorophosphate ($eta^6$-o-xylene)($eta^5$-cyclopentadienyl)iron(1+) triflate ($eta^6$-m-xylene)($eta^5$-cyclopentadienyl)iron(1+) tetrafluoroborate ($eta^6$-mesitylene)($eta^5$-cyclopentadienyl)iron(1+) hexafluoroantimonate ($eta^6$-hexamethylbenzene)($eta^5$-cyclopentadienyl)iron (1+) pentafluorohydroxyantimonate ($eta^6$-naphthalene)($eta^5$-cyclopentadienyl)iron(1+) tetrafluoroborate ($eta^6$-pyrene)($eta^5$-cyclopentadienyl)iron(1+) triflate ($eta^6$-toluene)($eta^5$-cyclopentadienyl)iron(1+) hexafluoroantimonate ($eta^6$-cumene)($eta^5$-cyclopentadienyl)iron(1+) hexafluoroantimonate ($eta^6$-p-xylene)($eta^5$-cyclopentadienyl)iron(1+) hexafluoroantimonate ($eta^6$-m-xylene)($eta^5$-cyclopentadienyl)iron(1+) hexafluoroantimonate ($eta^6$-hexamethylbenzene)($eta^5$-cyclopentadienyl)iron (1+) hexafluoroantimonate ($eta^6$-naphthalene)($eta^5$-cyclopentadienyl)iron(1+) hexafluoroantimonate ($eta^6$-pyrene)($eta^5$-cyclopentadienyl)iron(1+) hexafluoroantimonate (eta⁶-chrysene)(eta⁵-cyclopentadienyl)iron(1+) hexafluoroantimonate (eta⁶-perylene)(eta⁵-cyclopentadienyl)iron(1+) hexafluoroantimonate (eta⁶-chrysene)(eta⁵-cyclopentadienyl)iron(1+) pentafluorohydroxyantimonate (eta⁶-acetophenone)(eta⁵-methylcyclopentadienyl)iron (1+) hexafluoroantimonate (eta⁶-fluorene)(eta⁵-cyclopentadienyl)iron(1+) hexafluoroantimonate Examples of preferred salts of organometallic complex cations useful in the composition of the invention include one or more of the following:

(eta⁶-xylenes(mixed isomers))(eta⁵-cyclopentadienyl) iron (1+) hexafluoroantinomate (eta⁶-xylenes(mixed isomers))(eta⁵-cyclopentadienyl) iron (1+) hexafluorophosphate (eta⁶-m-xylene)(eta⁵-cyclopentadienyl)iron(1+) tetrafluoroborate (eta⁶-o-xylene)(eta⁵-cyclopentadienyl)iron(1+) hexafluoroantimonate (eta⁶-p-xylenes)(eta⁵-cyclopentadienyl)iron(1+) triflate (eta⁶-toluene)(eta⁵-cyclopentadienyl)iron(1+) hexafluoroantimonate (eta⁶-cumene)(eta⁵-cyclopentadienyl)iron(1+) hexafluoroantimonate (eta⁶-p-xylene)(eta⁵-cyclopentadienyl)iron(1+) hexafluoroantimonate (eta⁶-m-xylene)(eta⁵-cyclopentadienyl)iron(1+) hexafluoroantimonate (eta⁶-hexamethylbenzene)(eta⁵-cyclopentadienyl)iron (1+) hexafluoroantimonate (eta⁶-naphthalene)(eta⁵-cyclopentadienyl)iron(1+) hexafluoroantimonate (eta⁶-pyrene)(eta⁵-cyclopentadienyl)iron(1+) hexafluoroantimonate (eta⁶-chrysene)(eta⁵-cyclopentadienyl)iron(1+) hexafluoroantimonate (eta⁶-mesitylene)(eta⁵-cyclopentadienyl)iron(1+) hexafluoroantimonate (eta⁶-cumene)(eta⁵-cyclopentadienyl)iron(1+) hexafluorophosphate (eta⁶-mesitylene)(eta⁵-cyclopentadienyl)iron(1+) pentafluorohydroxyantimonate (eta⁶-toluene)(eta⁵-cyclopentadienyl)iron(1+) hexafluoroarsenate The curing agent for cationically polymerizable monomers may include a salt having an onium cation and a halogen-containing complex anion of a metal or metalloid as described in U.S. Pat. No. 4,751,138 and such description is incorporated herein by reference.

A suitable system that includes salts of organometallic complex cations as described by formula (III) and the free radical initiator are those combinations that upon application of sufficient energy, thermal, accelerated particle (electron beam), or electromagnetic radiation having a wavelength from about 200 to 800 nm, will generate an active species capable of catalyzing the polymerization of the compositions of the invention. The level of catalytic activity will, of course, depend on the choice of metal, ligands, and counterions in the organometallic salt and the optional additional free radical photoinitiator.

Also preferred are aromatic onium salts. These salts are disclosed, for example in U.S. Pat. Nos. 4,069,054 4,231, 951 and 4,250,203. Such salts are described by the formula $$AX \qquad (IV)$$

wherein

A is an organic cation selected from those described in U.S. Pat. Nos. 3,708,296, 3,729,313, 3,741,769, 3,794, 576, 3,808,006, 4,026,705, 4,058,401, 4,069,055, 4,101,513, 4,216,288, 4,394,403, and 4,623,676, all incorporated herein by reference, preferably selected from diazonium, iodonium, and sulfonium cations, more preferably A is selected from diphenyliodonium, triphenylsulfonium and phenylthiophenyl diphenylsulfonium; and X is an anion where X is the same as defined for formula (III). Preferably, the anions are $CF_3SO_3^-$, $BF_4^-$, $PF_6^-$, $SbF_6^-$, $SbF_5OH^-$, $AsF_6^-$, and $SbCl_6^-$.

The energy polymerizable compositions of this invention are radiation sensitive in addition to being thermally sensitive or they can be cured in a two stage curing process using radiation followed by heat. Heat can also be applied or removed before or during the irradiation process to promote or retard the curing of the composition.

In general, the thermally decomposable ester reaction products of a tertiary alkyl alcohol and an acid that forms a chelation complex with the metal ion of the organometallic complex salt useful in the invention are soluble compounds that upon heating, preferably to a temperature of 150° C. or more, decompose to release the chelating acid. Since the released acid forms a nonionizing chelation complex with the metal atom, the chelation reaction tends to remove metal atoms from a solution of the photolysed cationic organometallic salt. Thereupon, the acid of the salt anion is released for reaction to catalyze polymerization of the polymerizable material in the system.

The ester reaction product are prepared from tertiary alkyl alcohols and any tertiary alkyl alcohol that forms an ester reaction product with an appropriate acid may be used. Examples of suitable tertiary alkyl alcohols are t-butanol, 1,1-dimethylpropanol, 1-methyl-2-ethylpropanol, 1,1-dimethyl-n-butanol, 1,1-dimethyl-n-pentanol, 1,1-dimethylisobutanol, 1,1,2,2-tetramethylpropanol, 1-methylcyclopentanol, 1-methylcyclohexanol, 1,1-dimethyl-n-hexanol, 1,1-dimethyl-n-octanol, 1,1-diphenylethanol, and 1,1-dibenzyl ethanol.

Preferred chelating acids for inclusion in acid generating esters of the invention are oxalic, phosphoric and phosphorous acids. Other illustrative chelating acids that are useful include polycarboxylic acids, for example, malonic, succinic, fumaric, maleic, citraconic, acontic, o-phthalic, trimesic acids and other polycarboxylic acids having less than 3 carbons atoms separating carboxylic groups; hydroxycarboxylic acids, for example, glycolic, lactic, beta-hydroxybutyric, gamma-hydroxybutyric, tartronic, malic, oxalacetic, tartaric, and citric acids; aldehydic and ketonic acids, for example, glyoxylic, pyruvic, and acetoacetic acids; other acids of phosphorus, chromic acid, and vanadic acid.

The acid-generating esters may be prepared by procedures well known in the art. For example, acid-generating esters that incorporate the organic acids may be prepared by procedures described by Karabatsos et al. *J. Org. Chem*, 30, 689 (1965). Esters that incorporate phosphate, phosphonate and phosphite esters can be prepared by procedures described by Cox, Jr. *J. Am. Chem. Soc'y* 80, 5441 (1958); Goldwhite *J. Am. Chem. Soc'y* 79, 2409 (1957); and Cox, Jr. *J. Org. Chem.* 54, 2600 (1969), respectively.

The acid-generating ester should be relatively nonhydrolyzable and is essentially free of acid. To remove traces of acid from the acid-generating ester, it may be passed through a column filled with an ion exchange resin.

Also useful in accelerating the cationic polymerization when used in combination with salt of an organometallic complex cation and the acid generating ester are peroxides: acylperoxides, such as benzoyl peroxide; alkyl peroxides, such as t-butylperoxide; hydroperoxides, such as qumylhydroperoxide; peresters, such as t-butylperbenzoate; di-alkyl peroxydicarbonates, such as di-(sec-butyl) peroxydicarbonate; di-peroxyketals; and ketones peroxides, such as methylethylketone peroxide.

Adjuvants that may be blended into the composition include, but are not limited to, fillers, glass fibers, glass powder, silica, carbon black, carbon fibers, synthetic fibers, such as aramide, polyester, or nylon, colorants, fibers, woven and nonwoven fabrics, foaming agents, antioxidants, stabilizers, fire retardants, and viscosity adjusting agents.

Vibratory articles contemplated when practicing the present invention for vibration isolation include, but are not limited to, components of computers, motors, automotives, trucks, ships, airplanes, public works, building construction, electric or electronic materials, sporting goods, and the like.

A free layer damping construction may be prepared according to processes known to those in the art and may comprise the following steps:

1. coating a release liner with a layer of epoxy-acrylate thermoset resin composition,
2. curing the composition into a viscoelastic layer,
3. fixedly mounting the viscoelastic layer to a vibratory article that is to be damped, and
4. removing the release liner.

Alternatively, a free layer damping construction may be prepared as follows:

1. coating a vibrating article that is to be damped with a layer of an epoxy-acrylate thermoset resin composition, and
2. curing the composition into a viscoelastic layer in situ to form a free layer vibration-damping construction.

Since the viscoelastic layer generally has some adhesive properties, the epoxy-acrylate thermoset resin could be readily adhered to the vibratory article without the use of an adhesive. However, it is sometimes desirable to use a thin layer (for example, 20–50 μm) of a high-modulus adhesive, such as an acrylic adhesive or an epoxy adhesive, to bond the viscoelastic layer to the vibratory article. Advantageously, coating a vibratory article directly allows damping of 3-dimensional (and unusually shaped) articles.

The layer thickness of a free-layer damping construction is generally greater than that for a constrained layer construction, since damping performance of the free-layer construction is a function of the layer thickness, see Kerwin and Ungar, supra.

Vibration damping laminates containing epoxy-acrylate thermoset resins may be prepared according processes well known in art, for example, according to the steps of either Method I or Method II as described in U.S. Pat. No. 4,447,493, and such description incorporated herein by reference. Alternatively method III as described hereinbelow may be used to prepare vibration damping laminates.

For example, Method I provides the following steps:

1. coating a release liner with a layer of an epoxy-acrylate thermoset resin composition;
2. curing the composition into a viscoelastic layer,
3. transferring the viscoelastic layer from the release liner to a substrate,
4. adhering the viscoelastic layer into the substrate to form the constrained-layer vibration-damping construction, and
5. fixedly mounting the constrained layer vibration-damping construction to a vibratory article to be damped.

Alternatively, Method II provides the following steps:

1. coating a substrate with a layer of an epoxy-acrylate thermoset resin composition;
2. curing the composition to a viscoelastic layer in situ onto a substrate to form the constrained-layer vibration-damping construction; and
3. fixedly mounting the constrained-layer vibration-damping construction to a vibratory article to be damped.

Method III provides the following steps:

1. coating a release liner with a layer of an epoxy-acrylate thermoset resin composition;
2. curing the resin composition to tacky B-stage;
3. transferring the tacky resin composition to a substrate to form a constrained-layer vibration-damping construction;
4. removing the release liner;
5. fixedly mounting the constrained-layer vibration-damping construction to a vibratory article to be damped; and
6. curing the tacky resin composition.

Optionally, the epoxy-acrylate thermoset resin composition can be coated onto the substrate forming a constrained-layer vibration-damping construction. The coating is then cured to a tacky B-stage and then fixedly mounted to a vibratory article.

The constrained-layer construction can be mechanically or adhesively affixed to the vibratory article that is to be damped. Since the viscoelastic layer has adhesive properties, the cured resin can generally be adhered to a stiff layer or substrate without additional use of adhesives. It is sometimes desirable, however, to use a thin layer (for example, 20–50 μm) of high-modulus adhesive, such as an acrylic adhesive or an epoxy adhesive, to bond the viscoelastic layer to a solid article which can be, for example, an oil pan, a valve cover, or a transmission housing.

For most applications, the viscoelastic layer is a coating having a thickness of at least 0.01 mm up to about 100 mm, preferably 0.025 to 100 mm, and most preferably 0.05 to 100 mm. The coating can be applied by any of the techniques known in the art such as by spray, dip, knife, or curtain coating.

A stiff layer or a substrate is an essential part of constrained-layer vibration-damping constructions. A suitable material for a substrate has a stiffness of 0.40 (relative to stainless steel) as defined in *Handbook of Tables for Applied Engineering Science* 130 (ed. R. Bolz, 1974). The desired stiffness of the substrate is varied by adjusting the thickness of the layer, for example from about 25 micrometers to 5 centimeters, depending on the modulus of the substrate. Examples of suitable materials include metals such as iron, steel, nickel, aluminum, chromium, cobalt and copper, and alloys thereof; stiff thermoplastic materials, such as polystyrene, polyvinyl chloride, polyurethane, polyphenyl sulfide, and polycarbonate; stiff thermoset materials; fiber-reinforced thermoplastics; fiber-reinforced thermosets, such as epoxies, phenolics; ceramic fiber; and metal fiber-reinforced polyester, glasses, and ceramics.

Objects and advantages of this invention are further illustrated by the following examples, but the particular materials and amounts thereof recited in these examples, as well as other conditions and details, should not be construed to unduly limit this invention.

EXAMPLES

All materials are commercially available except where stated or otherwise made apparent. Measurements reported hereinbelow were made using a Rheometrics 700 RDA operating in dynamic temperature step mode with a torsion rectangular specimen geometry. Results were analyzed in terms of G', G" and Tan ($\delta$) as a function of temperature. Dynamic mechanical analysis (DMA) results of illustrative examples are summarized below and illustrate the high temperature damping characteristics of the preferred damping materials. As a result, they are suitable as the viscoelastic component in both free-layer and constrained-layer damping constructions. For high temperature applications using epoxy-acrylate thermoset resins, the temperature range over which Tan ($\delta$)>0.6 spans from about −20° to about 200° C., preferably spans a range from about 80° C. to about 200° C. The temperature interval over which effective damping was observed (Tan ($\delta$)=0.6) for a given composition was approximately 69° C. at 1 Hertz. Specific temperatures where maximum damping was observed were determined by the $T_g$ of the particular composition. G' is generally observed to be less than $10^{10}$ dynes/cm$^2$ in the glassy state and greater than about $10^6$ dynes/cm$^2$ in the rubbery region.

GLOSSARY

| | |
|---|---|
| IOA | isooctyl acrylate |
| IBA | isobornyl acrylate (available from Sartomer Co. under the trade designation "SR-506") |
| BA | n-butyl acrylate |
| HDDA | 1,6-hexanediol diacrylate (available from Sartomer Co. under the trade designation "SR-238") |
| ERL4299 | bis-(3,4-epoxy-6-methylcyclohexylmethyl) adipate (available from Union Carbide under the trade designation "ERL-4299") |
| MEK | methylethylketone |
| THFA | tetrahydrofurfuryl acrylate (available from Sartomer Co. under trade designation "SR-285") |
| KB-1 | 2,2-dimethoxy-1,2-dephenyl-1-ethanone (available from Sartomer Co. under the trade designation "KB-1") |
| Epon 828 | diglycidyl ether of bisphenol A (epoxy equivalent weight of 185–192 g · eg$^{-1}$) (available from Shell Chemical Co. under the trade designation "Epon 828") |
| Epon 1001F | diglycidyl ether of bisphenol A (epoxy equivalent weight of 525–550 g · eg$^{-1}$) (available from Shell Chemical Company under the trade designation "Epon 1001F") |
| tBOX | di-t-butyl oxalate (available from Aldrich Chem. Co.) |
| CHDM | 1,4-cyclohexyldimethanol, (available from Eastman Chemical Company) |
| Irgacure ™ 651 | CP(Cum)Fe$^+$PF$_6^-$ (available from Ciba Geigy) |
| Cp(Mes)Fe$^+$SbF$_6^-$ | (eta$^6$-mesitylene)(eta$^5$-cyclopentadienyliron)(1+) hexafluoroantimonate |
| Cp(Xyl)Fe$^+$SbF$_6^-$ | (eta$^6$-xylenes)(eta$^5$-cyclopentadienyliron)(1+) hexafluoroantimonate |
| Cp(Cum)Fe$^+$PF$_6^-$ | (eta$^6$-cumene)(eta$^5$-cyclopentadienyliron)(1+) hexafluorophosphate |

Examples 1–7

These examples describe the preparation of epoxy-acrylate compositions wherein the epoxy-acrylate composition was photopolymerized. The samples were evaluated for damping characteristics using a Rheometrics RSA solids analyzer and the results are summarized in Table 1.

Example 1

This example describes preparation of an epoxy-acrylate thermoset resin wherein the epoxy-acrylate thermoset composition was photopolymerized.

A partially polymerized syrup was prepared from a mixture of acrylate monomers and a low concentration of free radical photoinitiator. A solution of epoxy resin and cationic organometallic photoinitiator was prepared by heating the resin in the dark to about 50° to 60° C., adding the organometallic salt and stirring to complete dissolution. The epoxy resin solution was allowed to cool to room temperature before adding the acrylate syrup, additional free radical photoinitiator and crosslinking agent. This mixture was coated and cured using a sequential photopolymerization process. The first cure was under visible light irradiation which was followed by low intensity ultraviolet irradiation. The irradiate composition was then thermally post-cured. The thermal post-cure is optional.

A partially polymerized acrylate syrup was prepared by mixing 70 parts of IOA, 10 parts of IBA and 0.04 part of KB-1. The mixture was placed in a container and stirred while nitrogen gas was bubbled through the mixture to exclude oxygen. The mixture was irradiated with low intensity ultraviolet light until a viscous partially polymerized syrup was obtained.

In a separate container, 100 parts of ERL 4299 was heated to 50° to 60° C., then 0.5 part of Cp(Mes)Fe$^+$SbF$_6^-$ was added in the dark. The epoxy mixture was stirred until the catalyst dissolved then allowed to cool to room temperature.

In a separate container in the dark, were mixed 20 parts of the epoxy mixture, then 80 parts of the partially polymerized acrylate syrup, 0.8 part of KB-1 and 0.16 part of HDDA. This mixture was stirred to insure complete mixing of the components then evacuated in a metal bell jar to remove oxygen and bubbles from the composition.

The composition was knife coated between two sheets of polyester coated with a silicone release layer. The coated sandwich was passed through two irradiation zones. Zone 1 was an approximately 0.60 m section heated to 80° to 90° C. and had two 500 watt quartz/halogen lamps as the light sources. Zone 2 was an approximately 3.7 m section of low intensity ultraviolet lights. The mating speed was approximately 43 cm·min$^{-1}$. After passing through the two exposure zones, the samples were post-cured at 100° C. for 15 minutes.

The coated sample was evaluated for damping characteristics using a Rheometrics RSA II solids analyzer and the results are summarized in Table 1.

Example 2

An epoxy-acrylate thermoset resin was prepared according to the procedure of Example 1 using the following materials:

| | | |
|---|---|---|
| Acrylate Syrup | IOA | 20 parts |
| | IBA | 60 parts |
| | Irgacure ™ 651 | 0.032 part |
| Epoxy Mixture | ERL4299 | 20 parts |
| | Cp(Mes)Fe$^+$SbF$_6^-$ | 0.1 part |
| Expoxy-Acrylate Mixture | Acrylate Syrup | 80 parts |
| | Epoxy Mixture | 20 parts |
| | HDDA | 0.16 part |
| | Irgacure ™ 651 | 0.8 part |

The epoxy-acrylate resin was evaluated as in Example 1 and the results are summarized in Table 1.

Example 3

An epoxy-acrylate thermoset resin was prepared according to the procedure of Example 1 using the following materials:

| Acrylate Syrup | THFA | 10 parts |
|---|---|---|
| | IBA | 70 parts |
| | Irgacure ™ 651 | 0.032 part |
| Epoxy Mixture | ERL4299 | 20 parts |
| | Cp(Mes)Fe+SbF6− | 0.1 part |
| Expoxy-Acrylate mixture | Acrylate Syrup | 80 parts |
| | Epoxy Mixture | 20 parts |
| | HDDA | 0.16 part |
| | Irgacure ™ 651 | 0.8 part |

The epoxy-acrylate resin was evaluated as in Example 1 and the results are summarized in Table 1.

Example 4

An epoxy-acrylate thermoset resin was prepared according to Example 1 using the following materials and weights (grams):

| Acrylate Syrup | THFA | 70 parts |
|---|---|---|
| | IBA | 10 parts |
| | Irgacure ™ 651 | 0.032 part |
| Epoxy Mixture | ERL4299 | 20 parts |
| | Cp(Mes)Fe+SbF6− | 0.1 part |
| Expoxy-Acrylate Mixture | Acrylate Syrup | 80 parts |
| | Epoxy Mixture | 20 parts |
| | HDDA | 0.16 part |
| | Irgacure ™ 651 | 0.8 part |

The epoxy-acrylate resin was evaluated as in Example 1 and the results are summarized in Table 1.

Example 5

An epoxy-acrylate thermoset resin was prepared according to the procedure of Example 1 using the following materials:

| Acrylate Syrup | IBA | 90 parts |
|---|---|---|
| | Irgacure ™ 651 | 0.032 part |
| Epoxy Mixture | ERL4299 | 10 parts |
| | Cp(Mes)Fe+SbF6− | 0.1 part |
| Expoxy-Acrylate Mixture | Acrylate Syrup | 90 parts |
| | Epoxy Mixture | 10 parts |
| | HDDA | 0.18 part |
| | Irgacure ™ 651 | 0.8 part |

The epoxy-acrylate resin was evaluated as in Example 1 and the results are summarized in Table 1.

Examples 6A–6B

An epoxy-acrylate thermoset resin was prepared twice according to procedure of Example 1 using the following materials:

| Acrylate Syrup | IBA | 80 parts |
|---|---|---|
| | Irgacure ™ 651 | 0.032 part |
| Epoxy Mixture | ERL4299 | 20 parts |
| | Cp(Mes)Fe+SbF6− | 0.1 part |
| | Acrylate Syrup | 80 parts |
| Expoxy-Acrylate Mixture | Epoxy Mixture | 20 parts |
| | HDDA | 0.16 part |
| | Irgacure ™ 651 | 0.8 part |

The epoxy-acrylate resin was evaluated as in Example 1 and the results are summarized in Table 1.

Example 7

An epoxy-acrylate thermoset resin was prepared according to the procedure of Example 1 using the following materials:

| Acrylate Syrup | IBA | 70 parts |
|---|---|---|
| | Irgacure ™ 651 | 0.032 part |
| Epoxy Mixture | ERL4299 | 30 parts |
| | Cp(Mes)Fe+SbF6− | 0.1 part |
| Expoxy-Acrylate Mixture | Acrylate Syrup | 70 parts |
| | Epoxy Mixture | 30 parts |
| | HDDA | 0.14 part |
| | Irgacure ™ 651 | 0.8 part |

The epoxy-acrylate resin was evaluated as in Example 1 and the results are summarized in Table 1.

TABLE 1

| Example | Tan (δ) Amplitude | Temp (°C.) at Tan (δ) Max | Temp Range at Tan (δ) = 0.6 (°C.) |
|---|---|---|---|
| 1 | 0.77 | 0 | −9 to 15 |
| 2 | 0.84 | 94 | 83 to 112 |
| 3 | 0.87 | 115 | 101 to 149 |
| 4 | 0.62 | 32 | 28 to 35 |
| 5 | 0.99 | 117 | 110 to 120 |
| 6a | 1.05 | 151 | 131 to 200 |
| 6b | 1.17 | 145 | 123 to 180 |
| 7 | 0.82 | 140 | 120 to 160 |

Examples 8–12 and Comparative Example 1

These examples describe the preparation of acrylate-only thermoset resins wherein the acrylate-only compositions were photopolymerized.

Example 8

A partially polymerized syrup was prepared from a mixture of acrylate monomers and a low concentration of free radical photoinitiator. The syrup was allowed to cool to room temperature before adding additional free radical photoinitiator and crosslinking agent. This mixture was coated and cured using a sequential photopolymerization process. The first cure was under visible light irradiation which was followed by low intensity ultraviolet irradiation. The irradiate composition was then thermally post-cured. The thermal post-cure is optional.

A partially polymerized acrylate syrup was prepared by mixing 12.5 parts of THFA, 87.5 parts of IBA and 0.05 part of KB-1. The mixture was placed in a container and stirred while nitrogen gas was bubbled through the mixture to exclude oxygen. The mixture was irradiated with low intensity ultraviolet light until a viscous partially polymerized syrup was obtained.

In a separate container in the dark, the partially polymerized acrylate syrup, 0.8 part of KB-1 and 0.16 part of HDDA. This mixture was stirred to insure complete mixing of the components then evacuated in a metal bell jar to remove oxygen and bubbles from the composition.

The composition was knife-coated between two sheets of polyester coated with a silicone release layer. The coated sandwich was passed through two irradiation zones. Zone 1 was an approximately 0.60 m section heated to 80° to 90° C. and had two 500 watt quartz/halogen lamps as the light sources. Zone 2 was an approximately 3.7 m section of low intensity ultraviolet lights. The coating speed was approximately 43 cm·min$^{-1}$. After passing through the two exposure zones, the samples were post-cured at 100° C. for 15 minutes.

The coated sample was evaluated for damping characteristics using a Rheometrics RSA II solids analyzer and the results are summarized in Table 2.

Example 9

An acrylate thermoset resin was prepared according to the procedure of Example 8 using the following materials:

| Acrylate Syrup | THFA | 25 parts |
|---|---|---|
| | IBA | 75 parts |
| | Irgacure ™ 651 | 0.032 part |
| Acrylate Mixture | Acrylate Syrup | 100 parts |
| | HDDA | 0.2 part |
| | Irgacure ™ 651 | 0.8 part |

The acrylate thermoset was evaluated as in Example 8 and the results are summarized in Table 2.

Example 10

An acrylate thermoset resin was prepared according to the procedure of Example 8 using the following materials:

| Acrylate Syrup | THFA | 37.5 parts |
|---|---|---|
| | IBA | 62.5 parts |
| | Irgacure ™ 651 | 0.032 part |
| Acrylate Mixture | Acrylate Syrup | 100 parts |
| | HDDA | 0.2 part |
| | Irgacure ™ 651 | 0.8 part |

The acrylate thermoset resin was evaluated as in Example 8 and the results are summarized in Table 2.

Example 11

An acrylate thermoset resins was prepared according to the procedure of Example 8 using the following materials:

| Acrylate Syrup | THFA | 50 parts |
|---|---|---|
| | IBA | 50 parts |
| | Irgacure ™ 651 | 0.032 part |
| Acrylate Mixture | Acrylate Syrup | 100 parts |
| | HDDA | 0.2 part |
| | Irgacure ™ 651 | 0.8 part |

The acrylate thermoset resin was evaluated according to Example 8 and the results are summarized in Table 2.

Example 12

An acrylate thermoset resin was prepared according to the procedure of Example 8 using the following materials:

| Acrylate Syrup | THFA | 87.5 parts |
|---|---|---|
| | IBA | 12.5 parts |
| | Irgacure ™ 651 | 0.032 part |
| Acrylate Mixture | Acrylate Syrup | 100 parts |
| | HDDA | 0.2 part |
| | Irgacure ™ 651 | 0.8 part |

The acrylate thermoset resin was evaluated according to Example 8 and the results are summarized in the Table 2.

Example 13

An acrylate thermoset resin was prepared according to the procedure of Example 8 using the following materials:

| Acrylate Syrup | IBA | 100 parts |
|---|---|---|
| | Irgacure ™ 651 | 0.032 part |
| Acrylate Mixture | Acrylate Syrup | 100 parts |
| | HDDA | 0.2 part |
| | Irgacure ™ 651 | 0.8 part |

The acrylate resin was tested as in Example 8 and the results are summarized in Table 2.

TABLE 2

| Example | Tan (δ) Amplitude | Temp (°C.) at Tan (δ) Max | Temp Range at Tan (δ) = 0.6 (°C.) |
|---|---|---|---|
| 8 | 1.19 | 109.6 | 80 to 180 |
| 9 | 1.19 | 110 | 80 to 140 (flows) |
| 10 | 0.80 | 107.8 | 102.7 to 114.7 |
| 11 | 0.67 | 109.6 | 104.7 to 113 |
| 12 | 1.06 | 14.9 | 3.3 to 27.3 |
| 13 | 1.07 | 104.3 | 85.3 to 141.5 |

Examples 14–18

These examples described below illustrate dampling materials comprising an epoxy-acrylate thermoset resin wherein the epoxy-acrylate thermoset composition was photopolymerized and then thermally cured using an oxalate/organometallic salt catalyst system. The epoxy-acrylate resins were tested in the flexure mode (3-point bend) using a Seiko DMS110 dynamic mechanical analyzer. The results are summarized in Table 3.

Example 14

An acrylate syrup was prepared using 60 parts BA, and 40 parts THFA. 0.04 part KB-1 photoinitiator were then added to the acrylate syrup, and the mixture was deaerated by bubbling nitrogen. The acrylate monomers in the syrup were taken to an intermediate cure stage (B-stage) approximately 7% polymerization conversion by irradiation with BL-350 low intensity UV lamps. To 60 parts of this syrup was added 40 parts of an epoxy mixture that contained 80 parts Epon 828 and 20 parts Epon 1001F. To this acrylate-epoxy mixture was added 0.6 part KB-1 and 0.4 part Cp(Xyl)Fe$^+$ SbF$_6^-$, 0.4 part tBOX and 4 parts of melted CHDM. This mixture was then stored in the dark until used. Prior to coating, the mixture was deaerated in a vacuum chamber, then knife-coated to a 30 mils thickness between transparent release liners and irradiated with BL-350 UV lights at a light dosage of approximately 1960 mJ·cm$^2$. The film was a tacky, clear, self-supporting pressure sensitive adhesive.

The adhesive was cured between release liners in an oven for 30 minutes at 100° C. The cured film was clear, strong and tough. The properties are summarized in Table 3.

Example 15

An epoxy-acrylate vibration damping material was prepared according to the procedure described in Example 14. The film was cured in an oven for 30 minutes at 100° C., as described in Example 14. After curing, the film was opaque, strong and tough. The damping properties are summarized in Table 3.

| Acrylate Syrup | THFA | 40 parts |
|---|---|---|
| | BA | 60 parts |
| | KB-1 | 0.04 part |
| Epoxy Mixture | Epon 828 | 50 parts |
| | Epon 1001F | 50 parts |
| | | 0.1 part |
| Expoxy-Acrylate Mixture | Acrylate Syrup | 60 parts |
| | Epoxy Mixture | 40 parts |
| | Cp(Xyl)Fe$^+$SbF$_6^-$ | 0.4 part |
| | KB-1 | 0.6 part |
| | tBOX | 0.4 part |
| | CHDM | 4.0 parts |

Example 16

An epoxy-acrylate vibration damping material was prepared according to the procedure as described in Example 14. The film was cured in an oven for 30 minutes at 100° C., as described in Example 14. After curing, the film was opaque, strong and tough. The damping properties are summarized in Table 3.

| Acrylate Syrup | THFA | 30 parts |
|---|---|---|
| | BA | 70 parts |
| | KB-1 | 0.04 part |
| Epoxy Mixture | Epon 1001F | 20 parts |
| | Epon 828 | 80 parts |
| Expoxy-Acrylate Mixture | Acrylate Syrup | 60 parts |
| | Epoxy Mixture | 40 parts |
| | Cp(Xyl)Fe$^+$SbF$_6^-$ | 0.4 part |
| | KB-1 | 0.6 part |
| | tBOX | 0.4 part |
| | CHDM | 4.0 parts |

Example 17

An epoxy-acrylate vibration damping material was prepared according to the procedure as described in Example 14. The film was cured in an oven for 30 minutes at 140° C., as described in Example 14. After curing, the film was opaque, strong and tough. The damping properties are summarized in Table 3.

| Acrylate Syrup | IOA | 60 parts |
|---|---|---|
| | THFA | 40 parts |
| | KB-1 | 0.04 part |
| Epoxy Mixture | Epon 1001F | 20 parts |
| | Epon 828 | 80 parts |
| Expoxy-Acrylate Mixture | Acrylate Syrup | 60 parts |
| | Epoxy Mixture | 40 parts |
| | Cp(Xyl)Fe$^+$SbF$_6^-$ | 0.4 part |
| | KB-1 | 0.6 part |
| | tBOX | 0.4 part |
| | CHDM | 4.0 parts |

Example 18

The epoxy-acrylate material prepared in Example 14 was evaluated prior to heat curing. The damping characteristics are summarized in Table 3.

TABLE 3

| Example | Tan (δ) Amplitude | Temp (°C.) at Tan (δ) Max | Temp Range at Tan (δ) = 0.1 (°C.)* |
|---|---|---|---|
| 13 | 0.411 | 32.3 | −3.7 to 62.2 |
| 14 | 0.614 | 36.7 | −4.7 to 59.6 |
| 15 | 0.412 | 21.2 | −17.2 to 48.9 |
| 16 | 0.344 | 92.1 | 79.6 to 103.3 |
| 17 | 0.630 | −5.0 | −14 to 7 |

*In the flexure mode, the vibration damping temperature range is take at Tan (δ) = 0.1

Various modifications and alterations of this invention will become apparent to those skilled in the art without departing from the scope and spirit of this invention, and it should be understood that this invention is not to be unduly limited to the illustrated embodiments set forth herein.

We claim:

1. A method for damping the vibration of a vibrating solid article at temperatures in the range of −20° to 200° C. at 1 Hz, wherein said method comprises providing a viscoelastic layer construction with at least one layer comprising a cured epoxy-acrylate thermosetting resin consisting essentially of an interpenetrating network of polymerized epoxy monomers and polymerized acrylate monomers.

2. The method according to claim 1, wherein said epoxy-acrylate thermoset resin has a glass transition temperature in the range of −20° C. to 200° C. at 1 Hz.

3. The method according to claim 1, wherein said viscoelastic layer construction is a free-layer construction.

4. The method according to claim 1, wherein said viscoelastic layer construction is a constrained-layer construction comprising at least one substrate having a stiffness relative to stainless steel of at least 0.4 coated with at least one continuous layer of an epoxy-acrylate thermoset resin.

5. The method according to claim 4, wherein said substrate is selected from the group consisting of metals, stiff thermoplastic materials, stiff thermoset materials, fiber-reinforced thermoplastics, fiber-reinforced thermosets, ceramic fibers, glass, ceramics, and metal fiber-reinforced polyester.

6. A process for free layer damping comprising:
   a. coating a release liner with a layer of epoxy-acrylate resin composition comprising at least one acrylate monomer, at least one epoxy monomer, a free radical initiator, and a cationic initiator;
   b. curing said composition into a viscoelastic layer;
   c. fixedly mounting said viscoelastic layer to a vibratory article that is to be damped; and
   d. removing said release liner.

7. A process for free layer damping comprising:
   a. coating a vibratory article that is to be damped with a layer of an epoxy-acrylate thermoset resin composition comprising at least one acrylate monomer, at least one epoxy monomer, a free radical initiator, and a cationic initiator; and
   b. curing said composition into a viscoelastic layer in situ to form a free layer vibration-damping construction.

8. A process for constrained layer damping comprising:
   a. coating a release liner with a layer of an epoxy-acrylate thermoset resin composition comprising at least one acrylate monomer, at least one epoxy monomer, a free radical initiator, and a cationic initiator;

b. curing said composition into a viscoelastic layer;

c. transferring said viscoelastic layer from said release liner to a substrate, so as to adhere said viscoelastic layer to said substrate to form a constrained-layer vibration damping construction; and d. fixedly mounting the constrained layer vibration-damping construction to a vibratory article that is to be damped.

9. A process for constrained layer damping comprising:

a. coating a vibratory article that is to be damped with a layer of an epoxy-acrylate thermoset resin composition comprising at least one acrylate monomer, at least one epoxy monomer, a free radical initiator, and a cationic initiator;

b. curing said composition into a viscoelastic layer in situ to form a constrained-layer vibration-damping construction; and c. fixedly mounting the constrained layer vibration-damping construction to a vibratory article that is to be damped.

* * * * *